United States Patent [19]

Gaylin

[11] Patent Number: 4,602,763
[45] Date of Patent: Jul. 29, 1986

[54] METHOD FOR POSITIONING CABLE

[76] Inventor: Wayne L. Gaylin, 2936 Hunter Way, West Linn, Oreg. 97068

[21] Appl. No.: 602,591

[22] Filed: Apr. 20, 1984

[51] Int. Cl.⁴ ............................................ B65H 59/00
[52] U.S. Cl. ............................ 254/134.3 FT; 294/99.1
[58] Field of Search ............... 254/134.3 R, 134.3 FT; 294/86.42, 99.1; 15/104.3 SN, 104.05, 104.04, 104.14, 104.16

[56] References Cited

U.S. PATENT DOCUMENTS

| | | | |
|---|---|---|---|
| 2,311,767 | 2/1943 | Lombard | 294/86.42 |
| 2,740,178 | 4/1956 | Kellems | 294/86.42 |
| 2,750,152 | 6/1956 | Schinske | 254/134.3 FT |
| 3,391,545 | 7/1968 | Linneman | |
| 4,078,767 | 3/1978 | Battaglia | 254/134.3 FT |
| 4,331,322 | 5/1982 | Woodruff | |
| 4,337,922 | 7/1982 | Streiff et al. | |
| 4,518,152 | 5/1985 | Pierce et al. | 254/134.3 FT |

FOREIGN PATENT DOCUMENTS 1274778 2/1962 France .
54-13986 2/1979 Japan .

Primary Examiner—Robert C. Watson
Attorney, Agent, or Firm—Kolisch, Hartwell & Dickinson

[57] ABSTRACT

Method for placing fiber optic cable within a conduit. A carrier belt is disclosed which has means defining a channel extending therealong. The cable is lodged within the chanel before entering the conduit, and the assembly of belt and cable are drawn through the conduit by pulling on the belt whereby the cable is isolated from tension developed by the pulling operation.

10 Claims, 9 Drawing Figures

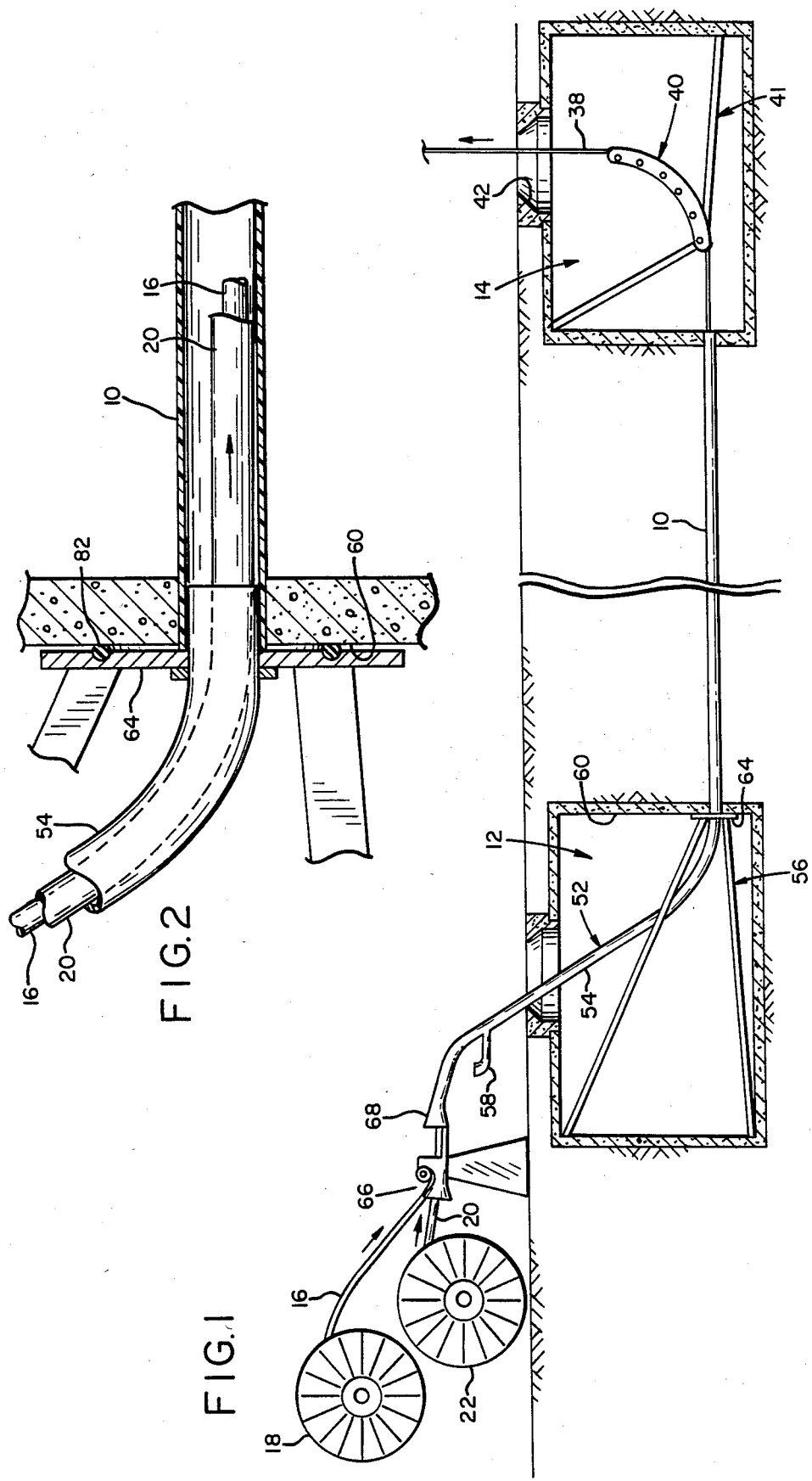

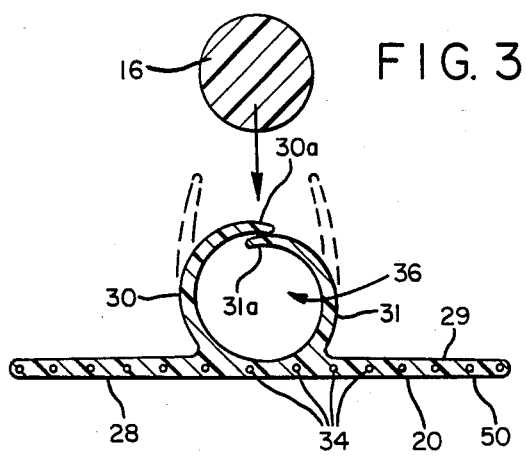
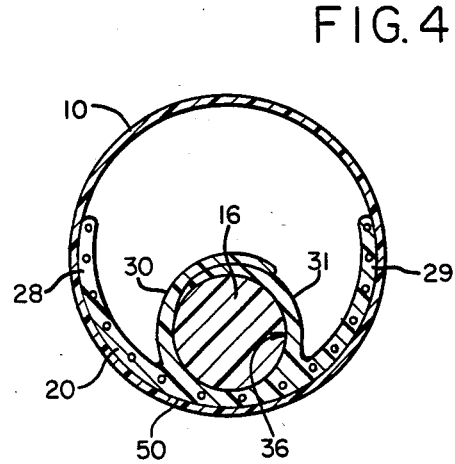
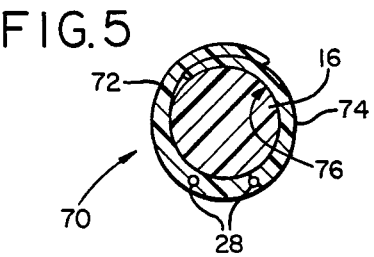
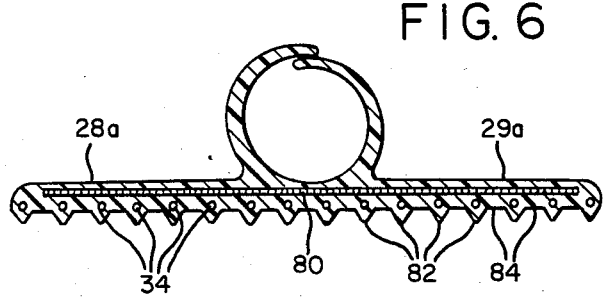
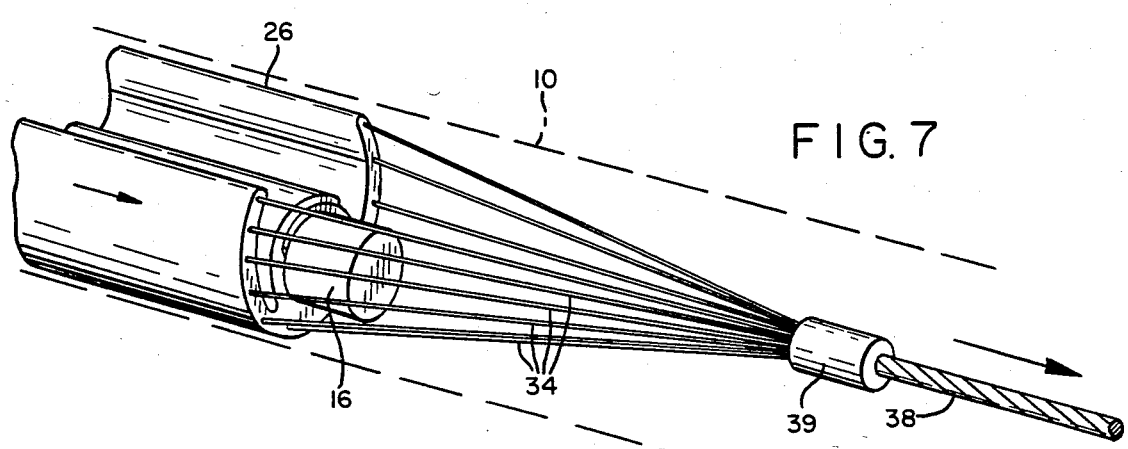
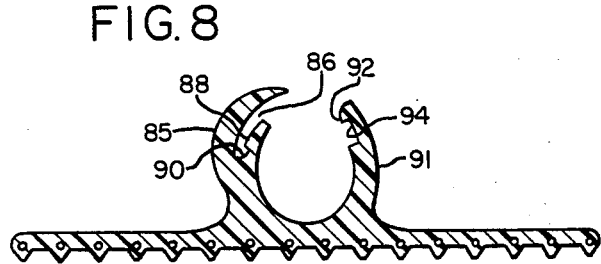
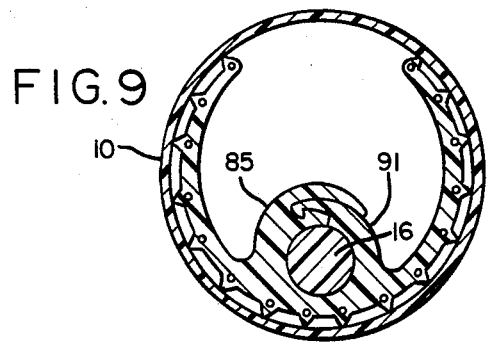

METHOD FOR POSITIONING CABLE

BACKGROUND AND SUMMARY OF THE INVENTION

This invention relates to the placement of cable within a conduit, and more particularly to a method and apparatus for performing such a cable placement, where placement is performed by drawing the cable through a conduit whereby such finally extends continuously through the conduit.

The invention has particular utility in connection with the placement of a cable or other elongate element within a conduit where the cable or element is tension-sensitive, in the sense that there is a limit imposed on the tension that may be applied to the cable or element in the placement operation. An example of such a tension-sensitive cable is so-called fiber optic cable, used in the communications industry. With such cable, manufacturers typically impose a limit on the maximum allowable tension that may be applied to the cable if manufacturing warranties are to be honored. Following the instant invention, a tension-sensitive element such as a fiber optic cable is placed within a conduit, not by pulling on such directly, but by pulling on a protective carrier belt which provides a protective sheath for the cable and which serves as a means for moving the cable through the conduit through a pulling force exerted on the belt rather than on the cable proper.

Further explaining the invention, and in particular its applicability to a fiber optic cable, the usual fiber optic cable is made up of a multiplicity of fine glass conductors serving to carry the information transmitted through the cable. Such conductors are relatively fragile, which has limited the amount of tension that may be applied to the cable in installing such in an underground conduit. Such a limit on tension has the direct result of limiting the length of cable that may be pulled through an underground conduit. With length restrictions present, increased costs are involved in cable installation, by reason of the greater number of vaults required to assist in the pulling operation, whereby such may be done without exceeding tension limitations. Furthermore, tension limitations result in the need for a greater number of fiber splices where one section of cable is spliced to another. Each splice generates a signal loss, with such losses accumulating throughout a project. Signal loss in turn impacts signal performance and so-called repeater/regeneration spacing. It should be obvious from this discussion that the provision of a method for installing relatively long lengths of a tension-sensitive element such as a fiber optic cable, without exceeding design-imposed tension limits on the cable, has very significant implications with respect to the cost of installing a line of cable, the performance of the cable once installed, and maintenance of the cable after installation.

Generally, therefore, it is an object of the invention to provide an improved method and means for positioning an elongate tension-sensitive element such as a cable within a conduit, which isolates the cable or element from the pulling force employed to produce the cable installation.

Another object is to provide an improved method and means for installing a tension-sensitive element such as a tension-sensitive cable within a conduit, which features an elongate continuous carrier belt that receives the cable on such entering the conduit, the belt within the conduit forming a protective sheath for the cable and the belt providing the medium through which a pulling force is applied when drawing the cable into and through the conduit.

Yet a further object is to provide a novel method of installing such a cable or element utilizing a carrier belt, which features the provision of an outer anti-friction surface contacting the inner wall of the conduit, and the introduction of lubricant between this friction surface and the inner wall of the conduit whereby the pulling force needed to draw a cable through a conduit is reduced.

In a preferred embodiment of the invention, the anti-friction surface is characterized by elongate ridges and valleys extending the length of the outer surface of the belt. The valleys serve to channel lubricant along the belt, with such lubricant working its way between the outer surfaces of the ridges and the inner conduit wall that such contact.

A still further object of the invention is to provide a carrier belt usable in cable installation, made of stiff but pliable material, and which includes a pair of opposed elongate flap expanses which form an enveloping sheath for a cable on such being drawn through a conduit. Outer margins of these flap expanses move to close adjacency with the carrier belt and cable lodged within the conduit.

In a preferred embodiment of the invention, the flap expanses, with the carrier belt unstressed, have a shape where such at least partially extend about a passage or channel for receiving the cable. Such flap expanses, with deforming of the belt, may be moved away from each other to permit reception of the cable in the channel. Within the conduit which receives the cable and carrier belt, the flap expanses move into a more covering relationship with respect to the cable lodged within the belt.

The carrier belt contemplated may have elongate tension-resistant means extending therealong through which pulling force is applied. Preferably such tension-resistant means operatively connects with enveloping flap expanses of the carrier belt, in a region of the belt remote from where edges of the flap expanses cooperatively adjoin each other, with the carrier belt and cable assembly lodged within a conduit.

These and various other objects and advantages are attained by the invention, as will become more fully apparent from reading of the following description, which is to be taken in conjunction with the accompanying drawings, wherein:

BRIEF DESCRIPTION OF THE DRAWINGS

FIG. 1 illustrates, in somewhat simplified form, apparatus for drawing a tension-sensitive element, such as a fiber optic cable, through an underground conduit, utilizing a lubricated carrier belt through which tension is applied during the drawing operation;

FIG. 2. is an enlarged view, partly broken away, of the entrance end of the conduit shown in FIG. 1 and associated structure;

FIG. 3 is a cross-sectional view of a carrier belt constructed as contemplated herein, illustrating in dashed outline flap expanses in the belt spread apart to receive the cable carried by the belt;

FIG. 4 is a cross-sectional view, illustrating the belt and cable as such appears with the assembly lodged within a conduit;

FIGS. 5 and 6 are cross-sectional views of carrier belts constructed according to modifications of the invention;

FIG. 7 is a perspective view illustrating apparatus utilizable in pulling on tension-resistant means or strands embedded in the carrier belt to affect drawing of the assembly through a conduit;

FIG. 8 is a cross-sectional view illustrating yet another modification of the invention; and FIG. 9 is a cross-sectional view illustrating the carrier belt of FIG. 8, together with a cable lodged therein and how the belt shapes itself within a conduit.

DETAILED DESCRIPTION OF THE INVENTION

Referring now to the drawings, and initially more particularly to FIG. 1, shown generally at 10 is a conduit which has been installed to extend underground, and which is adapted to have placed therein a fiber optic cable extending continuously through the conduit. Although portions of the conduit illustrated are shown as extending in a straight line, it should be understood that in practice such will normally have bends therein whereby such may extend around obstructions, etc. Typically, the conduit may have a plastic composition, such as PVC. The conduit extends between vaults, exemplified by vault 12 at the entrance end of the conduit, and vault 14 at the exit end of the conduit.

According to this invention, an elongate, tension-sensitive element such as fiber optic cable is placed so that such extends continuously along the length of conduit 10 by feeding such cable into conduit 10 with the cable lodged within the confines of an elongate carrier belt. The belt is fed into the conduit conjointly with the cable, so that the belt and cable extend coextensively within the conduit. Movement of the cable through the conduit is produced, not by pulling on the cable directly, but by pulling on the belt within which the cable is lodged. In this way, the cable is effectively isolated from the tension developed by the pulling operation.

In FIG. 1, the fiber optic cable which is to be installed in the conduit is shown at 16. Such is contained in windings on a reel 18 suitably rotatably mounted to accommodate paying out of cable as cable is progressively drawn through the conduit. The carrier belt which is fed into the conduit conjointly with the cable is shown at 20. Like the cable, the carrier belt is contained in windings, on a reel shown at 22 suitably rotatably mounted to accommodate paying out of the carrier belt as such is progressively drawn through conduit 10.

The carrier belt which is provided for the purpose of transporting the fiber optic cable through conduit 10 may take any of several different forms of construction. One form of belt that may be employed to advantage is the one illustrated in cross-section in FIGS. 3 and 4, FIG. 3 showing the belt as it is configured prior to moving into conduit 10, and FIG. 4 illustrating the belt with cable lodged within it and as such is configured on moving through conduit 10.

Referring to FIGS. 3 and 4, belt 20 comprises a generally flat transverse extent made up of flap expanse 28 extending along and forming one edge of the belt and flap expanse 29 extending along and forming the opposite edge of the belt. Also part of the belt and projecting out from one face of the belt are a pair of flap expanses indicated at 30 and 31, respectively. Flap expanses 30 and 31 are laterally spaced from each other where they join with the remainder of the belt. As illustrated, these flap expanses may curve toward each other progressing toward edge margins of the flap expanses indicated at 30a and 31a.

The belt is provided with elongate tension-resistant means extending along its length utilized in pulling the belt and the cable lodged thereon through conduit. In the belt shown in FIGS. 3 and 4, such takes the form of elongate metal cables or strands, shown in cross section at 34. Such are shown embedded in the flat extent formed by flap expanses 28, 29.

The belt is non-perforate and made of a stiff but pliable material exhibiting a low coefficient of friction when moved over the inner wall surface of conduit 10. The belt, for instance, may be made of polyethylene plastic or PVC, although by indicating such plastics it is not intended to exclude other plastic compositions having low coefficient of friction characteristics and that are available at low cost.

Flap expanses 30, 31, as seen in FIG. 3, define an elongate channel or passage 36 which extends along one face of the belt, adapted to have lodged therewithin the cable being installed. The belt may have, in its natural unstressed condition, the cross-sectional configuration shown in FIG. 3. To lodge the cable in passage 36, the belt may be passed continuously under a plow-type divider, which functions to spread the flap expanses apart to the positions shown in dashed outline in FIG. 3 and at the same time guide the cable into the now opened-up passage. With the cable positioned in the passage and on leaving the divider the flap expanses tend to return to the position shown in solid outline in FIG. 3. The belt on moving into conduit 10 is deformed, with flap expanses 28, 29 tending to conform to the inner curvature of the conduit, and as a consequence being partially turned over toward each other on the side or face of the belt having flap expanses 30, 31. By imparting such transverse curvature to the belt, flap expanses 30, 31 are caused to move to a more overlapped relative position, more snugly to embrace the cable carried by the belt, as illustrated in FIG. 4.

With the belt within the conduit, flap expanses 28, 29 of the belt extend about the interior wall of the conduit a distance which is greater than one half the circumference of this interior wall, as also best illustrated in FIG. 4. By reason of this extent of the flap expanses, and the flexible and resilient nature of the belt composition, there is a tendency for the belt to seat within the conduit with the belt snugly against one side of the conduit, as shown in FIG. 4.

Pulling of the carrier belt through conduit 10 may be performed as illustrated in FIG. 7, utilizing a winch cable 38 extending into conduit 10 from its exit end and secured through coupler 39 to the ends of strands 34 protruding outwardly from the end of belt 26. As illustrated in FIG. 1, this winch cable extends from conduit 10 in vault 14 over a pulley case 40 (braced by strut structure 41) and through a manhole 42 to a winch (not shown) which may be operated to take in the winch cable whereby the carrier belt and fiber optic cable are pulled through conduit 10.

Referring to FIGS. 3 and 4, the bottom of the carrier belt as illustrated in these figures is formed by a smooth antifriction surface 50. Following the instant invention, it is contemplated that a lubricant be applied to this surface to reduce sliding friction of the assembly of belt and fiber optic cable within conduit 10. An effective lubricant, with a polymer such as polyethylene employed for the composition of the carrier belt, may be water, water being economical and essentially chemically inert.

Referring to FIG. 1, a feed chute is shown at 52 for feeding the carrier belt with cable lodged therein into the entrance end of conduit 10. Such feed chute may comprise essentially a conduit 54 which extends downwardly to a remote end received within an end of conduit 10 as shown in FIG. 2. The feed chute is held in place within vault 12 by strut structure 56. Lubricant, i.e., water, is introduced into the feed chute through water injector coupling 58 communicating with the interior of the feed chute conduit 54. Forming a seal between the feed chute and wall 60 of vault 12 is a seal such as an O-ring 62 interposed between wall 60 and plate 64 forming part of strut structure 56.

With continuing reference to FIG. 1, shown at 66 is an assembly station operating to assemble the fiber optic cable whereby such lies within the flap expanses of the carrier belt. As earlier described, this may comprise a plow-type separator which separates the flap expanses in the carrier belt and at the same time feeds the cable into the passage which lies therebetween. On leaving the divider the flap expanses move over each other to more closely confine the cable. On entering enlarged end 68 of conduit 54, the assembly is further contracted whereby such ultimately has the shape shown in cross-section in FIG. 4.

It should be noted that the tension-resistant means, i.e., the elongate strands 34 which are embedded in side flap expanses 28, 29, are operatively connected to flap expanses 30, 31 which define elongate passage or channel 36 in a region of the belt disposed toward the opposite side of this passage than the side where flap margins 30, 31 overlap each other. As a consequence, with tension applied to strands 34, and on the carrier belt together with the fiber optic cable lodged therein moving over a curved expanse in conduit 10, there is minimal tenancy of flap expanses 30, 31 to be pulled apart from each other and to opposite sides of the fiber optic cable thus to expose the cable.

In FIG. 5 there is illustrated a modified form of construction. Carrier belt 70 shown in this figure includes flap expanses 72, 74 which curve around on each other to define therewithin a passage 76 for lodging the fiber optic cable. The belt may be formed so that in an unstressed or relaxed state, the cross section of the carrier belt is substantially as shown in FIG. 5. Cable is inserted within the belt after first deforming the belt by separating the flap expanses from each other to provide access to passage 76. After insertion of the cable into passage 76, the belt is permitted to return to its original cross-sectional shape, with the flap expanses then moving toward each other into the overlying relationship illustrated. The belt is moved through a conduit by tension-resistant strands indicated at 78 embedded in the belt on the opposite side of passage 76 from the side which is closed off by the overlapping margins of flap expanses 72, 74.

In FIG. 6 there is illustrated a still further embodiment of the invention. In the belt shown in this figure flap expanses 28a, 29a have embedded therewithin, in addition to elongate metal strands 34a, a tension-resistant ribbon 80. Such may take the form of a strip of Kevlar, which is a ribbon of tension-resistant non-metallic strands disposed side-by-side in the ribbon and held together in such ribbon by a film of plastic applied over the strands therein. In this form of the invention, strands 34a and ribbon 80 conjointly form in the carrier belt the tension-resistant means which is relied upon for pulling of the belt through the conduit.

It should further be noted that in the carrier belt of FIG. 6, the anti-friction surface of the belt, which is the underside thereof as illustrated in FIG. 6, is formed by elongate ridges 82 extending the length of the belt separated by valleys 84. These valleys with the belt traveling through conduit 10 provide channels for channeling lubricant applied to the antifriction surface of the belt along the length of the belt and supplying such lubricant to the interface between the inner surface of conduit 10 and the outer extremities of ridges 82 which contact this conduit surface.

In FIGS. 8 and 9, yet another modification of the invention is illustrated. In this form of the invention, flap expanse 85 of the carrier belt is provided along the length thereof with an elongate receiving groove 86 with this groove on one side thereof being defined by shoulder surface 88 which borders a channel 90 extending along groove 86. Flap expanse 91 is provided along the outer extremity thereof with a ridge 92 bordering a channel passage 94.

With a fiber optic cable lodged in the passage defined between these flap expanses, and on the carrier belt and cable subsequently being positioned within a conduit, the belt is deformed as shown in FIG. 9, with movement of the flap expanses together. Such movement shifts the outer portion of expanse 91 into groove 86 of expanse 85 to produce an interlocking fit, with ridge 92 lodging within channel 90 and channel passage 94 receiving shoulder surface 88.

It should be obvious that the carrier belt apparatus and method disclosed herein produces a number of desirable results, advantages and features. With a tension-sensitive element such as a fiber optic cable lodged within the carrier belt, the carrier belt provides a convenient instrumentality through which a pulling force may be applied to draw the belt together with the cable through the conduit. The belt during such pulling provides full protection for the cable lodged therewithin, both in isolating tension from being applied to the cable and also in protecting the cable from abrasion, etc. An anti-friction surface is provided which may be lubricated for the purpose of reducing the friction developed between the carrier belt and the inner wall of conduit 10. The fiber optic cable or tension-sensitive element is relatively easily lodged within the carrier belt for entry of the belt into the conduit. With the assembly of belt and cable within the conduit, the cable is effectively sheathed by the belt with the cable loosely held so as not to be stretched should the belt stretch. The apparatus and method contemplated permits a far greater length of a fiber optic cable to be installed within an underground conduit then possible where pulling force is applied to the cable itself and tension limitations must be observed.

While various modifications of the invention have been described, it should be obvious that other arrangements and modifications are possible without departing from the spirit of the invention.

It is claimed and desired to secure as Letters Patent:

1. In the pulling of an elongate tension-sensitive continuous element through a conduit, the method comprising feeding the continuous element into an entrance opening of the conduit, with feeding of the element lodging the element within the lateral confines of an elongate continuous carrier belt and feeding such belt into the entrance opening of the conduit with the element whereby the belt extends coextensively with the element within the conduit, providing the carrier belt with an anti-friction surface that extends in substantial uninterrupted smoothness in a direction extending along the length of the belt and that contacts the inner surface of the conduit, lubricating said anti-friction surface adjacent the entrance of the conduit to promote sliding of the belt and element over the inner surface of the conduit, and pulling on said belt through an exit opening of the conduit to move the assembly of belt and element through the conduit while the belt of such assembly is lubricated.

2. The method of claim 1, wherein said anti-friction surface comprises a collection of elongate surface edges extending the length of the carrier belt which surface edges are separated by channels, and lubricating is performed by introducing lubricant to said surface edges and the channels separating said surface edges.

3. The method of claim 1, wherein said carrier belt comprises a continuous elongate plastomer band and is provided with elongate tension-resistant strand means extending along the length of said band and embedded in the band, and pulling on said belt is performed by pulling on said strand means.

4. In the pulling of an elongate tension-sensitive continuous element through a conduit, the method comprising feeding the continuous element into an entrance opening of the conduit, with feeding of the element lodging the element between the lateral confines of an elongate, continuous, flexible and resilient plastomer belt, feeding the belt into the conduit conjointly with the element and forming with said belt on such becoming positioned within the conduit an elongate protective sheath for said element, pulling on said belt through an exit opening of the conduit to move the belt and element lodged therewithin through the conduit, and the feeding of the belt conjointly with the element continuing as the belt is pulled through the conduit.

5. The method of claim 4 which further comprises introducing lubricant into said conduit and to the exterior of said belt to produce a lubricant film on the exterior of the belt.

6. The method of claim 4, wherein elongate tension-resistant strands are embedded in the belt inwardly of its exterior, and pulling is performed by pulling on ends of said strands.

7. In the pulling of an elongate cable through a conduit utilizing an elongate belt for protecting the cable during the pulling, said belt comprising a substantially flat transverse extent formed at least in part by a first pair of elongate flap expanses and further including a second pair of elongate flap expanses laterally spaced from each other and joined to the flat extent on one side of the belt, the method comprising depositing the cable on the belt between said second pair of flap expanses, shaping the belt upon such entering the conduit whereby the first pair of flap expanses move toward each other on the side of the belt having the second pair of flap expanses and whereby said flat extent conforms to the curvature of the inner wall of the conduit, movement of said first pair of flap expanses producing movement of the second pair of flap expanses into snugger proximity with said cable, and pulling the cable through the conduit by pulling on the belt to produce tension in the belt and with the belt isolating the cable from the applied tension.

8. In the pulling of an elongate cable through a conduit utilizing an elongate belt for protecting the cable during the pulling thereof, the method comprising providing a belt made of flexible and resilient plastomer material and which includes a pair of elongate flap expanses disposed, with the belt in an unstressed condition, with the flap expanses opposite each other to define an elongate passage therebetween, forcing said flap expanses away from each other to provide an entry to such passage and with such entry provided lodging the cable within the passage, introducing the belt with the cable lodged therewithin into an entrance end of the conduit, the opposed flap expanses after lodging of the cable and on the belt moving into the conduit moving toward each other to close off the entry to said passage, from an exit end of the conduit applying a pulling force to the belt to advance the belt through the conduit and with the belt the cable lodged within the passage, and the introduction of the belt with the cable lodged therewithin continuing as the belt advances through the conduit.

9. The method of claim 8, wherein pulling of the belt is performed with the introduction of lubricant against exterior surfaces of the belt which slide on the inner surface of the conduit.

10. In the pulling of an elongate tension-sensitive cable through a conduit, the method comprising providing an elongate protective sheath made of flexible and resilient polymer material and and having an elongate internal passage extending therealong, said sheath having elongate tension-resistant strand means embedded in the wall thereof, positioning the cable whereby such extends loosely along said passage with tension applied to the sheath thus being isolated from the cable, introducing the sheath with the cable positioneded therewithin into the conduit, and applying a pulling force to the tension-resistant means in said sheath to move the sheath through the conduit and with the sheath the cable lodged within the passage of the sheath.

* * * * *